Oct. 6, 1931. H. SCHANTZ 1,826,577
MOLDING MACHINE
Filed March 19, 1929 2 Sheets-Sheet 2
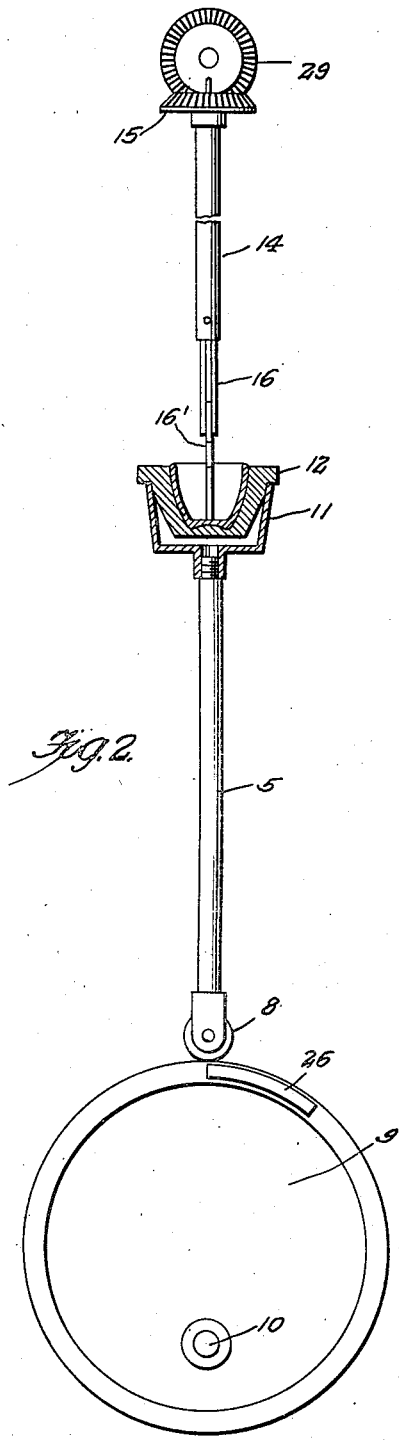
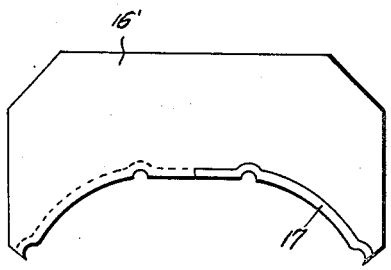
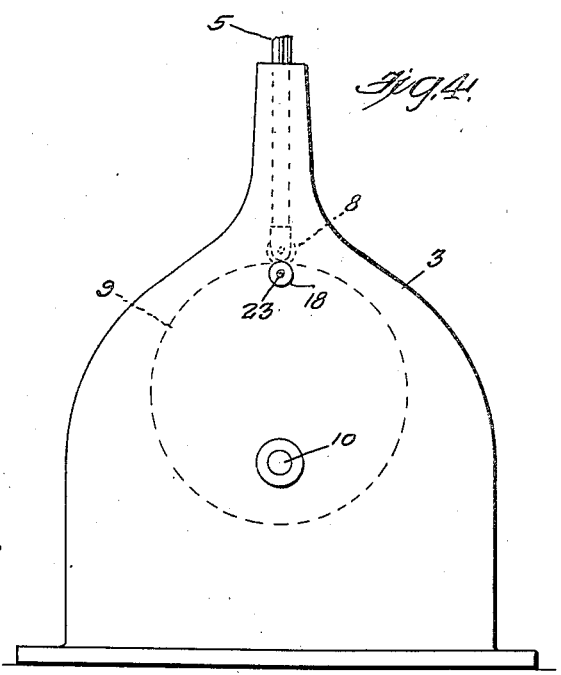
Inventor
Henry Schantz,
By Clarence A. O'Brien
Attorney Patented Oct. 6, 1931

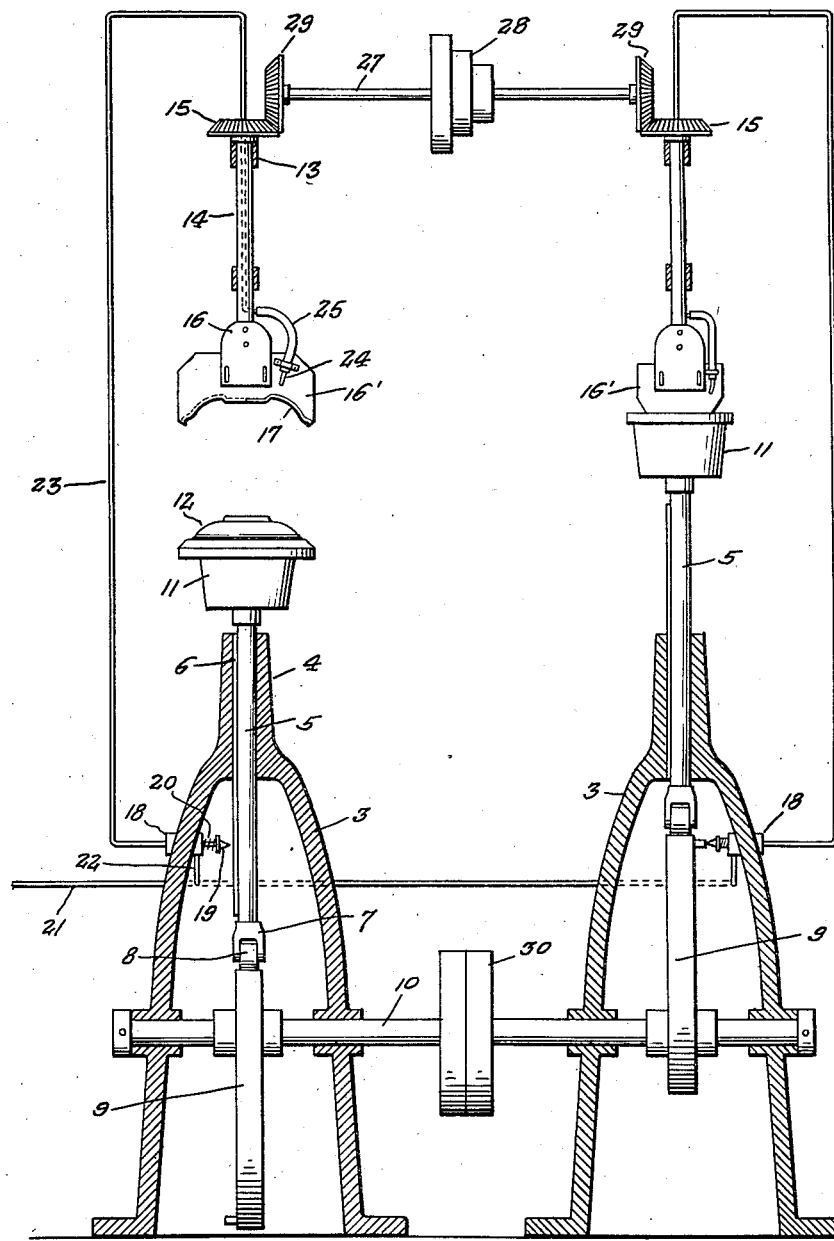

1,826,577

UNITED STATES PATENT OFFICE

HENRY SCHANTZ, OF NEW CASTLE, PENNSYLVANIA

MOLDING MACHINE

Application filed March 19, 1929. Serial No. 348,230.

The present invention appertains to new and useful improvements in molding machines, especially those types particularly adapted for molding ceramic articles.

The principal object of this invention is to provide a machine for molding flat and hollow ceramic vessels in a quick and efficient manner.

Another very important object is to provide a machine which, because of its extremely simple construction will permit the manufacture of ceramic vessels at a greatly reduced cost.

Another object is to provide a machine of this character which will not be susceptible of readily developing defects, such as occur in machines of more complicated design.

After considering the following specification and claim other important objects and advantages of the invention will readily become apparent.

In the drawings:

Figure 1 represents a partial vertical sectional view through the improved machine.

Figure 2 represents a partial sectional and diagrammatic view of one of the improved machines.

Figure 3 is a side elevation of the molding tool.

Figure 4 is a side elevation of the base structure of the machine.

Referring to the drawings, wherein like numerals designate like parts, it will be seen that Figure 1 shows two machines connected together for simultaneous operation. It can be perceived that one of the machines is adapted for molding flat ceramic wear, while the other is for molding hollow ceramic wear.

The present invention includes in the construction of each machine a base 3, of hollow construction, the upper portion of which is constricted to provide a guide for the vertically reciprocatory shaft 5. The bore through the bearing 4 is grooved to receive the tongue 6, longitudinally extending on the shaft 5. The lower portion of the shaft 5 is equipped with a yoke 7, in which a roller 8 is mounted for rolling contact with the periphery of a cam wheel 9 carried by a power shaft 10, said power shaft being journaled horizontally through the housing 3 in the manner clearly shown in Figure 1.

The upper end of the shaft 5 which projects above the bearing 4 has mounted thereon a potter's wheel 11, which is of the usual hollow construction for receiving the article mold 12.

Suitable bearings 13—13 slidably receive a vertically disposed shaft 14, of hollow construction. The upper end of the shaft 14 carries a bevelled gear 15, while the lower end of the shaft has a molding tool carrier 16 secured thereto.

The molding tool has a molding face of a contour designed to shape a predetermined form of vessel, while the edge portions of the surface forming side of the tool are bevelled as at 17, for neatly pressing the surplus material on the outside from the article being molded.

A valve 18 is mounted on the base 3, and has a stem projecting inwardly of the housing and equipped with a bevelled head 19, a spring 20 being interposed between the valve body and the head 19 for normally maintaining the valve element seated. A liquid supply line 21 connects with the valve 18, through the pipe 22, and a pipe 23 extends from the valve 18 and has communication with the hollow shaft 14.

A nozzle 24 is secured to the tool 16' and is connected with the hollow shaft 14 by means of a hose 25.

As is clearly shown in Figure 2, the cam 9 is provided at one side and adjacent its periphery with a rib 26 for engagement with the valve head 19 for periodically opening the valve to permit a flow of liquid through the pipe 23, to the nozzle 24, for maintaining the moldable material moist during the operation of forming the same.

Figure 1 shows two machines of the same construction as above described, excepting that the machine toward the right in Figure 1, and is sectionally shown in Figure 2 is especially adapted for molding hollow vessels instead of flat wear, such as the other machine is especially adapted to manufacture. The drive shaft 27 is provided with a reducing pulley 28 and is equipped at each end with a bevelled gear 29 for mesh with the gears 15 of the rotatable shaft 14.

The drive shaft 10 for reciprocating the lower shaft 5 extends through the base of each machine and carries a pulley 30 at its intermediacy. Otherwise, the machines function in substantially the same manner and are of identical construction.

Obviously, in construction of this machine, various changes in the specific shape, size, materials, as well as the connection of any number of these machines together can be resorted to, without departing from the spirit or scope of this invention as claimed hereinafter.

Having described this invention, what is claimed as new is:

A molding machine of the class described, comprising a pair of vertically arranged shafts, means for rotating one shaft, means for moving the other shaft vertically, molding members attached to the adjacent ends of the shafts, a nozzle carried by the member of the rotary shaft, a supply pipe connected with the nozzle, a valve in said pipe, and means for opening the valve when the vertically movable shaft is in a position with the molding member in engagement with the molding member of the rotary shaft.

In testimony whereof I affix my signature.

HENRY SCHANTZ.